Oct. 27, 1959  D. S. TANNER  2,910,260
SWIVEL STAND FOR MODEL AIRPLANES
Filed Jan. 3, 1956
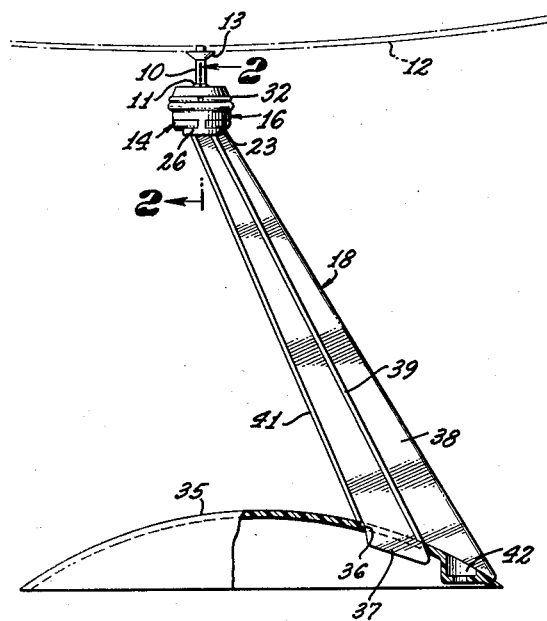
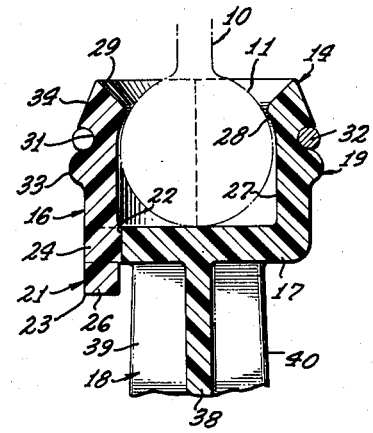
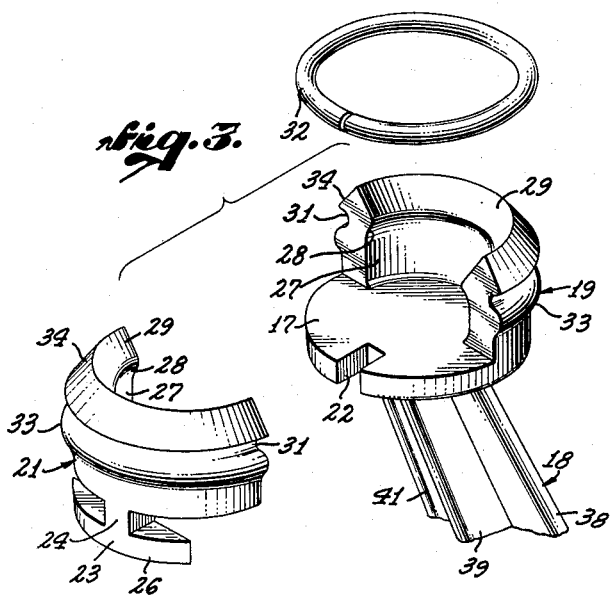
DAVID S. TANNER,
INVENTOR.
HUEBNER, BEEHLER,
WORREL & HERZIG,
ATTORNEYS.
BY

United States Patent Office 2,910,260
Patented Oct. 27, 1959

2,910,260

SWIVEL STAND FOR MODEL AIRPLANES

David S. Tanner, Culver City, Calif.

Application January 3, 1956, Serial No. 556,841

2 Claims. (Cl. 248—181)

This invention relates to a display stand, and more particularly to such a stand for supporting miniature airplane models at various angles to simulate the orientation of an airplane in flight.

Model airplane construction kits of parts of miniature airplanes are marketed for assembling authentic miniature models of airplanes with the view of permitting convenient and ready assembly thereof by inexperienced individuals, including children. Such kits, at relatively low cost, contain miniature airplane parts made of molded plastics. The parts usually are made to almost exact scale to closely resemble the actual size airplanes.

The parts are made for fitting together without the necessity of cutting or smoothing operations. The resulting joints, in the completed model airplane, should be tight and strong without the appearance of cracks. Such joints should be of relatively simple design and they should be capable of being economically constructed. Finally, the assembled model airplane should be strong and tough to resist breakage and withstand rough treatment.

The assembled model airplane usually is mounted on a stand, having at the upper end thereof a ball and socket joint. The ball of the joint is connected to a portion of the plane, generally the fuselage, so that the model plane can be positioned at various angles to the horizontal to simulate an airplane in flight while diving, turning, climbing, and so forth. This ball and socket joint should be strongly made to prevent cracking of the socket during normal use.

Such use includes swiveling the airplane model, as described above, and also includes pulling the ball out of the socket of the joint for the purpose of replacing a given airplane model with another model. Thus, during use, the socket is repeatedly subjected to having a ball pulled from the socket of the joint and having another ball snapped into the socket. Thus, the ball and socket joint must be capable of withstanding a considerable amount of rough usage, involving repeated swiveling of the ball in the socket and repeated withdrawal and insertion of a ball from and into the socket, respectively.

Accordingly, it is an important object of my invention to provide a rugged and durable ball and socket joint for a model airplane display stand consisting of parts that can be assembled rapidly and efficiently without the necessity of finishing operations.

Another object is to provide an improved display stand of the above-mentioned character adapted to be formed from plastics materials and to support a model airplane at various angles on a ball and socket joint to simulate an airplane in flight.

A further object is to provide a swivel stand for displaying model airplanes comprising a tough and durable ball and socket joint capable of withstanding a great deal of wear and tear, occasioned by repeated swiveling and replacement of the ball in the joint.

Additional objects will become apparent from the following description:

In general terms, my invention comprehends a swivel display stand comprising a ball and socket joint having a movable section in the socket capable of moving radially thereof, into engagement with the ball, and tension means about the assembled socket for urging the movable section thereof into contact with the ball. The movable section of the socket preferably is provided with a tongue means to cooperate with a groove means in the remaining portion of the socket for the purpose of positioning and supporting the removable section in the assembled socket.

The tension means employed preferably is a resilient ring, such as a split or spring ring, snapped or fitted into a groove formed around the periphery of the assembled socket. The tension or spring ring is designed to urge the movable section of the socket into controlled frictional engagement with the ball. The degree of friction in the engagement is controlled to permit swiveling and positioning of the airplane model at any of a desired range of angles, and to permit withdrawal and insertion of a ball from and into the socket. The latter operations are performed by causing movement of the movable section under the tension applied by the ring. This should be accomplished without breaking away any portions of the socket.

A more detailed description of a specific embodiment of the invention is given with reference to the drawing, wherein:

Figure 1 is a side elevational view of a specific embodiment of the swivel stand with a portion of the base thereof cut away and showing the joint between the base and the stand;

Figure 2 is a somewhat enlarged fragmentary detail view in section taken on the line 2—2 of Figure 1 showing an assembled ball and socket joint; and Figure 3 is a somewhat enlarged exploded fragmentary detail view showing a fixed portion of the socket, a removable section of the socket, and a split tension ring.

In the specific embodiment of my invention shown in the drawing, a model airplane is connected to a stem 10 integral with a ball 11. The airplane is connected to the ball at any convenient portion thereof, such as at a portion of the fuselage indicated in phantom at 12. The model airplane may be one of a series of models designed for assembly from parts contained in a construction kit. Such parts preferably are molded from plastics materials to provide relatively inexpensive kits having exact details of the actual size airplane model represented by the miniature model.

The stem 10 of the ball 11 is provided with a flared portion 13 and is molded integral with the airplane to give a strong, tough and durable connection. Other means of connecting the stem of the ball to the airplane may be employed, such as riveting or cementing the stem of the ball into the wall of the airplane fuselage.

The ball 11 thus attached to the airplane, depends from the underside of the fuselage 12 of the airplane model and is adapted to be received in a socket 14. The socket 14 comprises an annular side portion 16, and a generally disc-shaped base portion 17, preferably made integral with the stand 18 at the upper end thereof, by molding the socket and stand as a unit.

The side portion 16 of the socket contains a fixed portion 19 and a removable section 21, as best shown in Figure 3. The fixed portion 19 of the socket preferably is made integral with the base portion 17 by molding therewith. The base portion 17 is notched at 22, opposite the position of fixed portion 19. The removable section 21 of the socket is provided with an inverted T-shaped tongue member 23 extending from the bottom of the section 21. As will be seen in the drawing, the T-shaped member 23 and the notch 22 cooperate to function as a tongue and groove means for guiding and supporting the removable section 21 in position in the assembled socket.

Stem 24 of the inverted T-shaped member 23 is made to fit slidably in the notch 22 and is made sufficiently long to barely extend through notch 22. In this manner, the position of the cross-bar 26 fits snugly against the underside of bottom disc member 17, as best shown in Figure 2. It will be seen that the removable section 21 is locked in position in the assembled socket and is prevented from being pulled upwards out of position when the ball 11 is pulled from the assembled socket.

The internal annular surface 27 of the socket is cylindrical in shape as it extends upward from the base portion 17 of the socket. As the cylindrical surface 27 approaches the upper end thereof, it changes to a spherical curvature at 28 having approximately the same radius of curvature as the ball 11. An outwardly flared portion 29 is formed on the upper end of the socket to assist in guiding the ball 11 into position when it is pushed into the socket.

The socket assembly is provided with an external annular groove 31 to receive a split tension or spring ring 32. The spring ring may be made of any suitable resilient material, metallic or non-metallic, such as steel, bronze, or plastics materials. An annular shoulder 33 is formed on the socket below the groove 31, and an annular beveled portion 34 is formed on the socket above the groove 31, to assist in snapping the ring 32 over the beveled portion 33, and to retain the ring in the groove under tension after it is snapped into position.

It will be seen that in the assembled ball and socket joint tension on the ball 11 is not supplied by the elasticity of the material, such as plastics materials, of which the side portion 16 of the socket is made. On the contrary, the tension on the ball is supplied alone by the tension of spring ring 32. As a result of this arrangement and mode of operation, cracking, splitting or breaking of the side portion 16 of the socket is prevented, even during rough and strenuous use in swiveling the ball in the socket, and in repeatedly pulling the ball out of the socket and forcing a ball into the socket.

The spring ring 32, snapped into the groove 31 on the outside surfaces of fixed portion 19 and removable section 21 of the socket, holds these portions together. It also controls the friction between the ball and the socket, and provides the tension necessary to hold the model airplane, attached to the ball 11, in any position desired within the limits of the movement of the ball in its socket. It will be seen that when a ball 11 is pulled out of the socket, or pushed into the socket, the side portion 16 of the socket does not have its walls forced or spread radially outward by pressure of the ball.

Instead, the pressure of the ball causes the movable section 21 to ride outward against the tension of the spring ring under the guidance and support of the tongue in groove operation of inverted T-shaped member 23 in notch 22. The movable section 21 first rides radially outward and then radially inward during either an insertion or extraction of a ball 11 into or out of the socket.

The stand shown in the drawing includes a base member 35 shaped as a segment of a globe. It has a radial slot 36 therein aligned with a central vertical plane passing through the base end of a size sufficient to receive a tongue 37 of a leg member 38 of the stand. Leg 38 has two lateral strips 39 and 40 extending outwardly from the sides thereof and a flanged trailing edge 41.

The tongue 37 does not extend to the forward edge of the leg member 38, and the leg member is fitted straight into the slot 36. The inclined end surfaces of the tongue 37 and the slot 36 provide a wedge-type action which causes the leg member 38 to be fitted tightly against the surface of the base 35. A well 42 is provided in the base 35 for receiving a screw to secure the base to a supporting surface, if desired.

It will be seen that the method of engaging leg member 38 in the base 35 guarantees that it will be stable even though the leg member is inclined at an acute angle to the horizontal. The construction of the leg member 38 is made in the manner described above to impart strength and rigidity thereto. The resulting swivel stand assembly is strong and sturdy and exhibits unusual stability at all angles of orientation of the model airplane.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures.

Having described my invention, what I claim as new and desire to secure by Letters Patent is:

1. A swivel stand for displaying model airplanes comprising a ball-and-socket joint including a ball, a socket member having a removable section capable of being moved radially with respect to the axis of the socket member, a fixed portion in the socket member having a base member attached thereto, a groove formed on the free edge of said base member and extending radially inward therefrom, a tongue depending from said removable section and positioned in said groove, said tongue having shoulders at either end engaging said base above and below said groove, respectively, said tongue and shoulders thereby serving to position, guide and support said removable section with respect to said fixed section, and tension means urging said removable section radially inward.

2. The invention of claim 1, wherein means is provided to detachably secure a model airplane to said ball to extend thereabove and to be sustained thereby.

References Cited in the file of this patent

UNITED STATES PATENTS

| | | |
|---|---|---|
| 538,534 | O'Neill | Apr. 30, 1895 |
| 621,123 | Mulholland | Mar. 14, 1899 |
| 687,183 | Kolander | Nov. 19, 1901 |
| 886,578 | Bradley | May 5, 1908 |
| 916,286 | Evans | Mar. 23, 1909 |
| 957,984 | Mowry | May 17, 1910 |
| 1,186,428 | Newman | June 6, 1916 |
| 1,697,560 | Frederick | Jan. 1, 1929 |
| 2,650,788 | Hulstein | Sept. 1, 1953 |

FOREIGN PATENTS

| | | |
|---|---|---|
| 10,310 | Great Britain | May 5, 1902 |
| 721,576 | Germany | June 11, 1942 |